Figure 1:
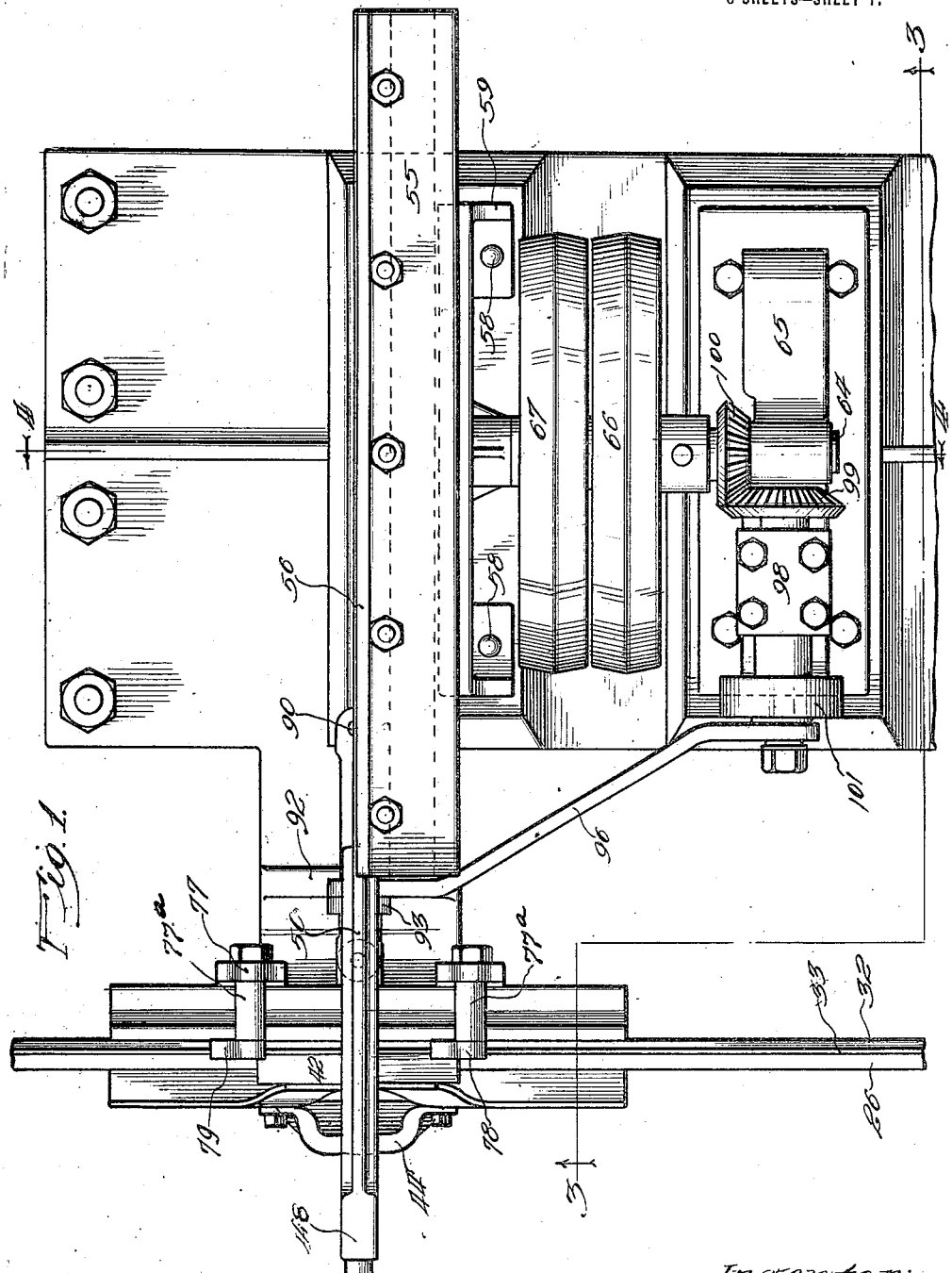

L. S. SHERWOOD.
SAW FILING MACHINE.
APPLICATION FILED JULY 6, 1920.

1,422,486. Patented July 11, 1922.
8 SHEETS—SHEET 1.

Witness:
Stephen F. Rebora

Inventor:
Ludlow S. Sherwood
by Davenport, Lee, Chritton and Wiles
Attys.

L. S. SHERWOOD.
SAW FILING MACHINE.
APPLICATION FILED JULY 6, 1920.

1,422,486.

Patented July 11, 1922.
8 SHEETS—SHEET 2.

Inventor:
Ludlow S. Sherwood

L. S. SHERWOOD.
SAW FILING MACHINE.
APPLICATION FILED JULY 6, 1920.

1,422,486.

Patented July 11, 1922.
8 SHEETS—SHEET 5.

Witness:

Inventor,
Ludlow S. Sherwood

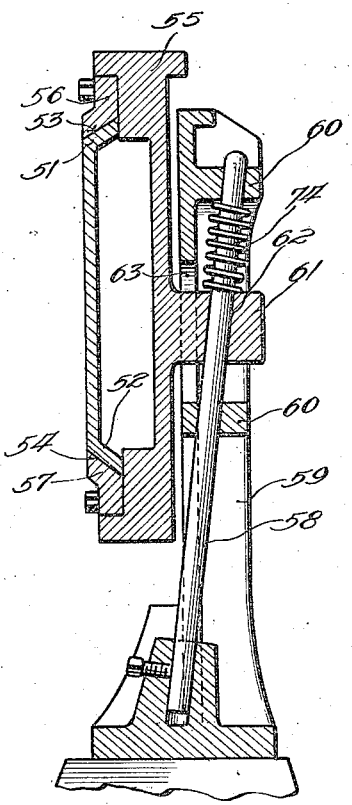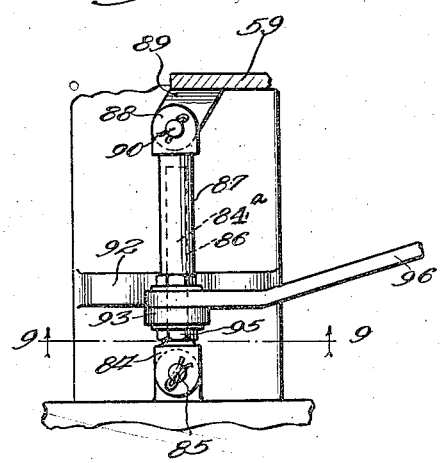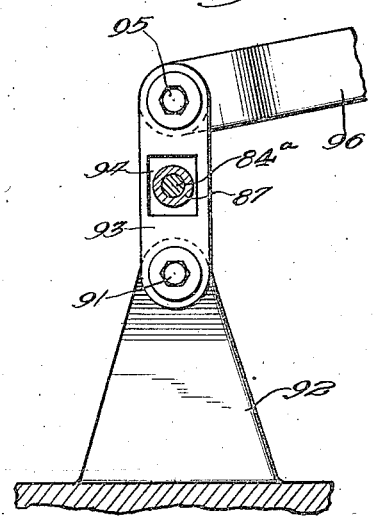

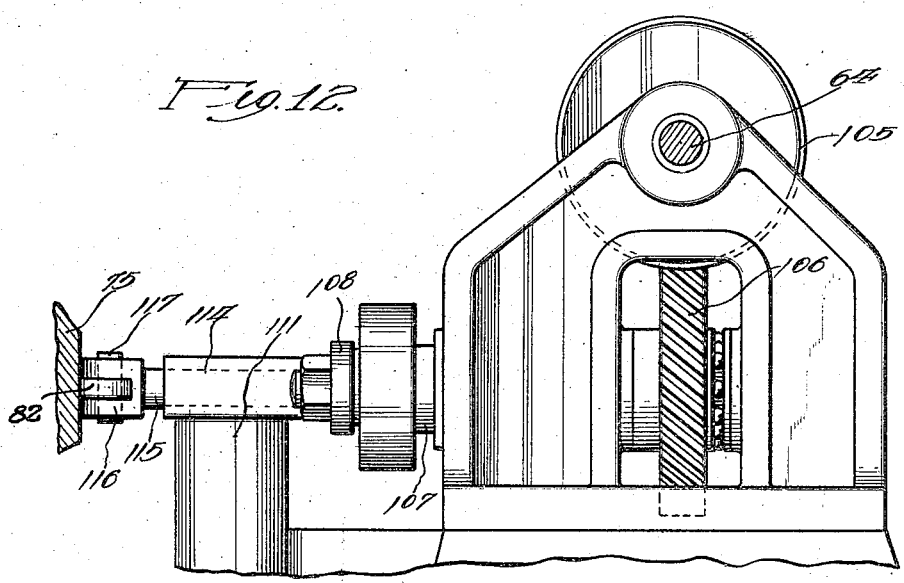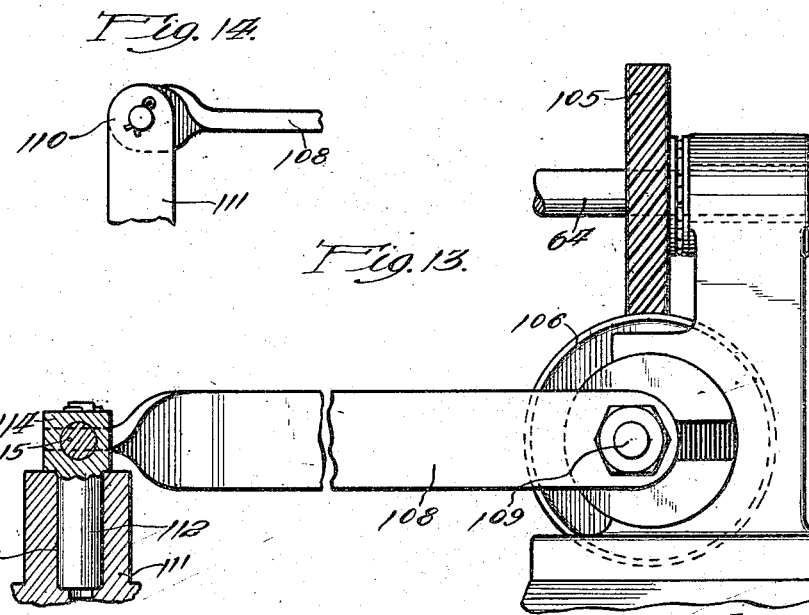

L. S. SHERWOOD.
SAW FILING MACHINE.
APPLICATION FILED JULY 6, 1920.

1,422,486.

Patented July 11, 1922.
8 SHEETS—SHEET 8.

Witness:
Stephen F. Rebora

Inventor.
Ludlow S. Sherwood
By Dyrenforth, Lee, Chritton and Wiles Attys.

UNITED STATES PATENT OFFICE.

LUDLOW S. SHERWOOD, OF CHICAGO, ILLINOIS.

SAW-FILING MACHINE.

1,422,486.  Specification of Letters Patent.  Patented July 11, 1922.

Application filed July 6, 1920. Serial No. 394,137.

*To all whom it may concern:*

Be it known that I, LUDLOW S. SHERWOOD, a citizen of the United States, residing at Chicago, in the county of Cook and State of Illinois, have invented a new and useful Improvement in Saw-Filing Machines, of which the following is a specification.

My object, generally stated, is to provide new and useful improvements in saw-filing machines, to the end that the machines shall be better adapted to perform their work, especially in connection with different kinds of saws, and to provide a structure which shall be of comparatively simple and inexpensive construction and durable and positive in use.

Specifically stated, certain of the others of my objects are to provide in a machine of the character stated and of a construction wherein the saw-filing operation is produced in an automatic manner, for the filing to the proper angle, the teeth of a saw, whether they be of undercut form, as in the case of rip-saws, or otherwise; to provide for the filing of the teeth at any desired angle relative to the plane of the saw; to provide a novel and simple construction of mechanism for operating the file and mechanism for producing the automatic feeding of the saw through the machine in a positive and accurate manner; to provide in a saw-filing machine for the positive and automatic feeding, by a step by step movement of the saw, regardless of the angle at which it is caused to extend, in the adjustment of the machine, relative to the path of movement of the file; to provide for the filing of saws not only of the type in which the saws are of uniform width, but also saws which are of other forms, as for example those which taper from one end to the other or are of irregular form, in which cases the back edge of the saw does not parallel the toothed portion thereof; to provide for the ready change from one machine for filing the teeth at one angle, to another machine for filing other portions of the teeth at a different angle, and thereby facilitate the filing operation; and other objects as will be understood from the following description.

Referring to the accompanying drawings—

Figure 2:
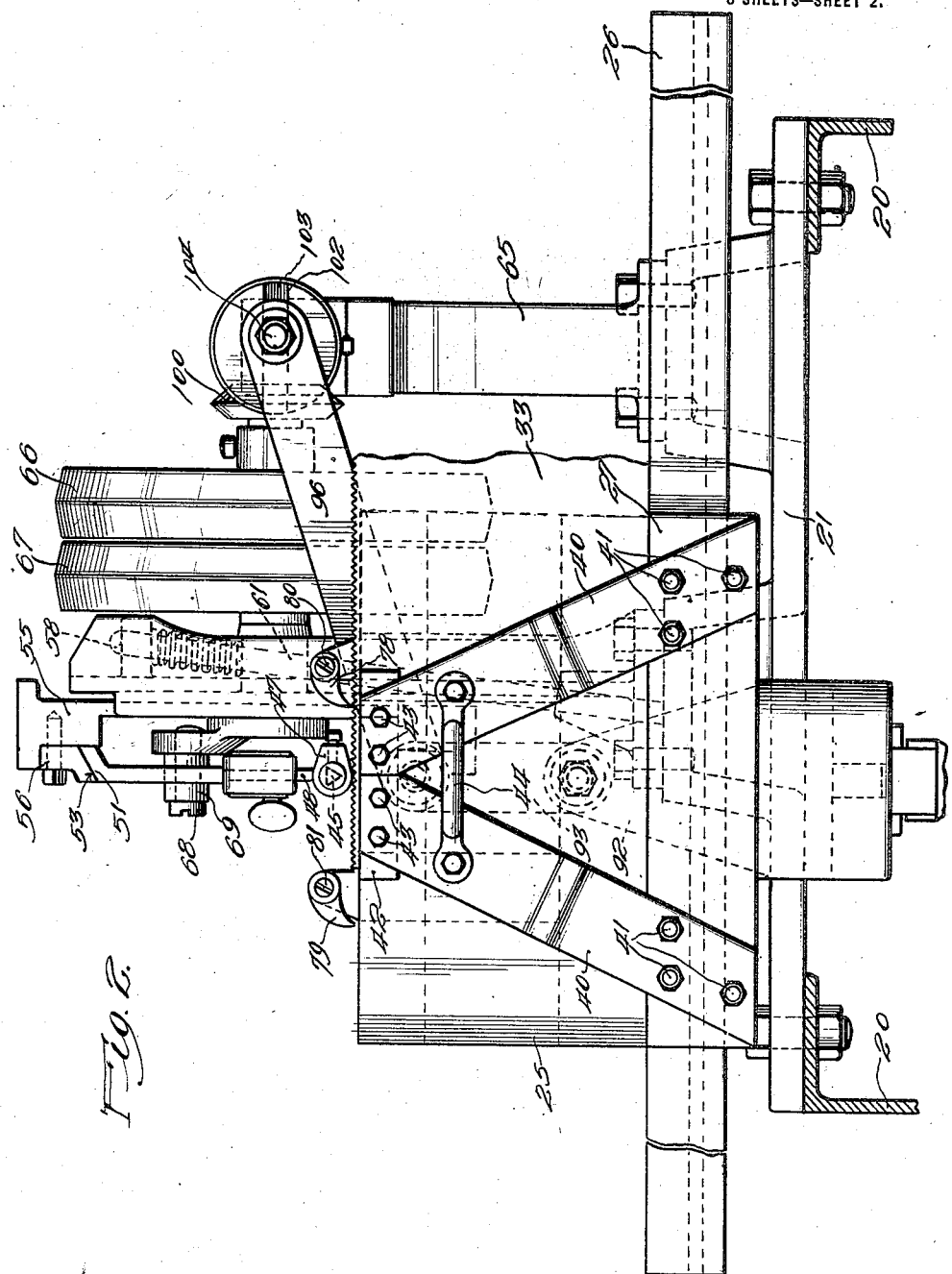
Figure 3:
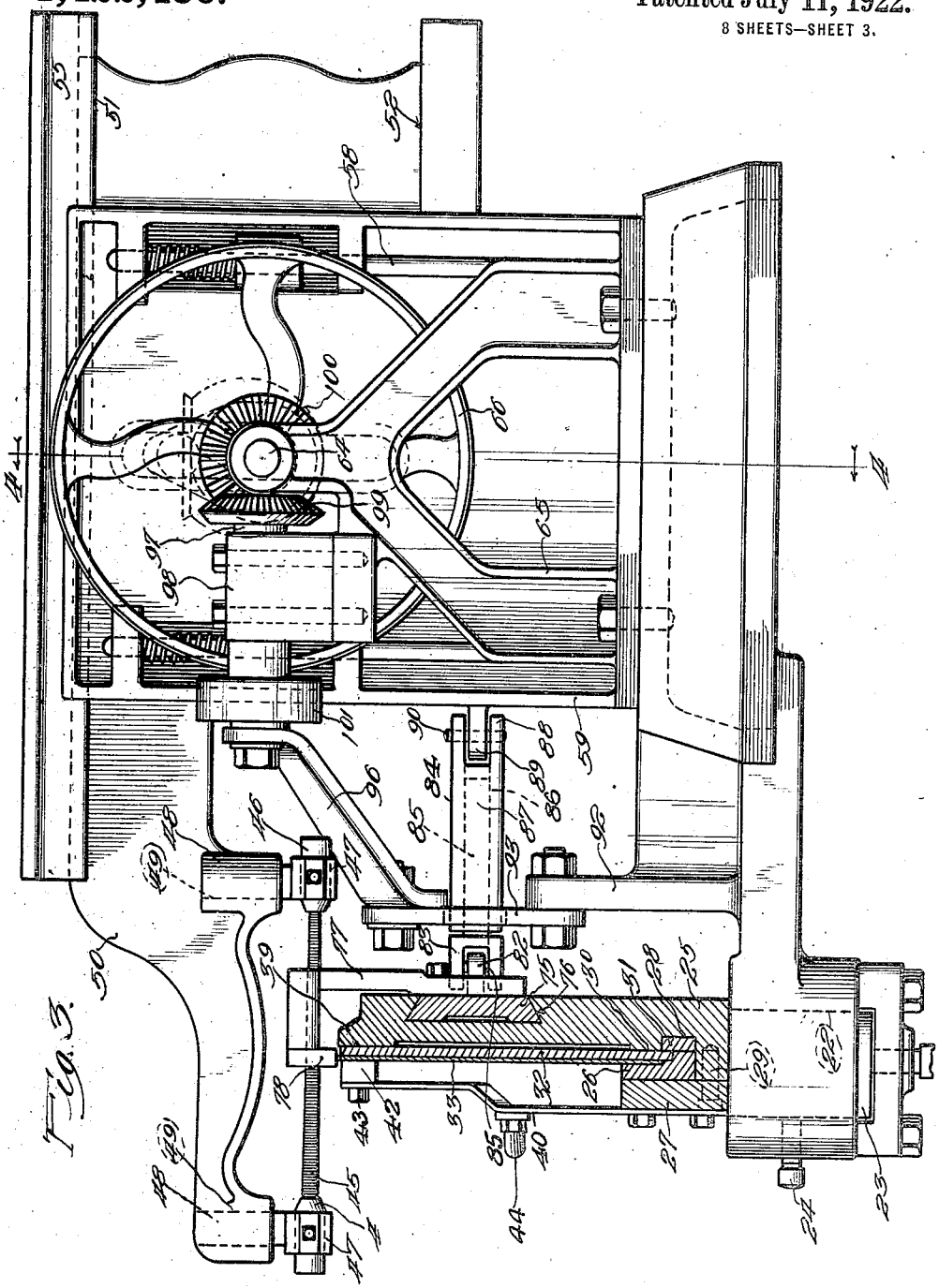
Figure 4:
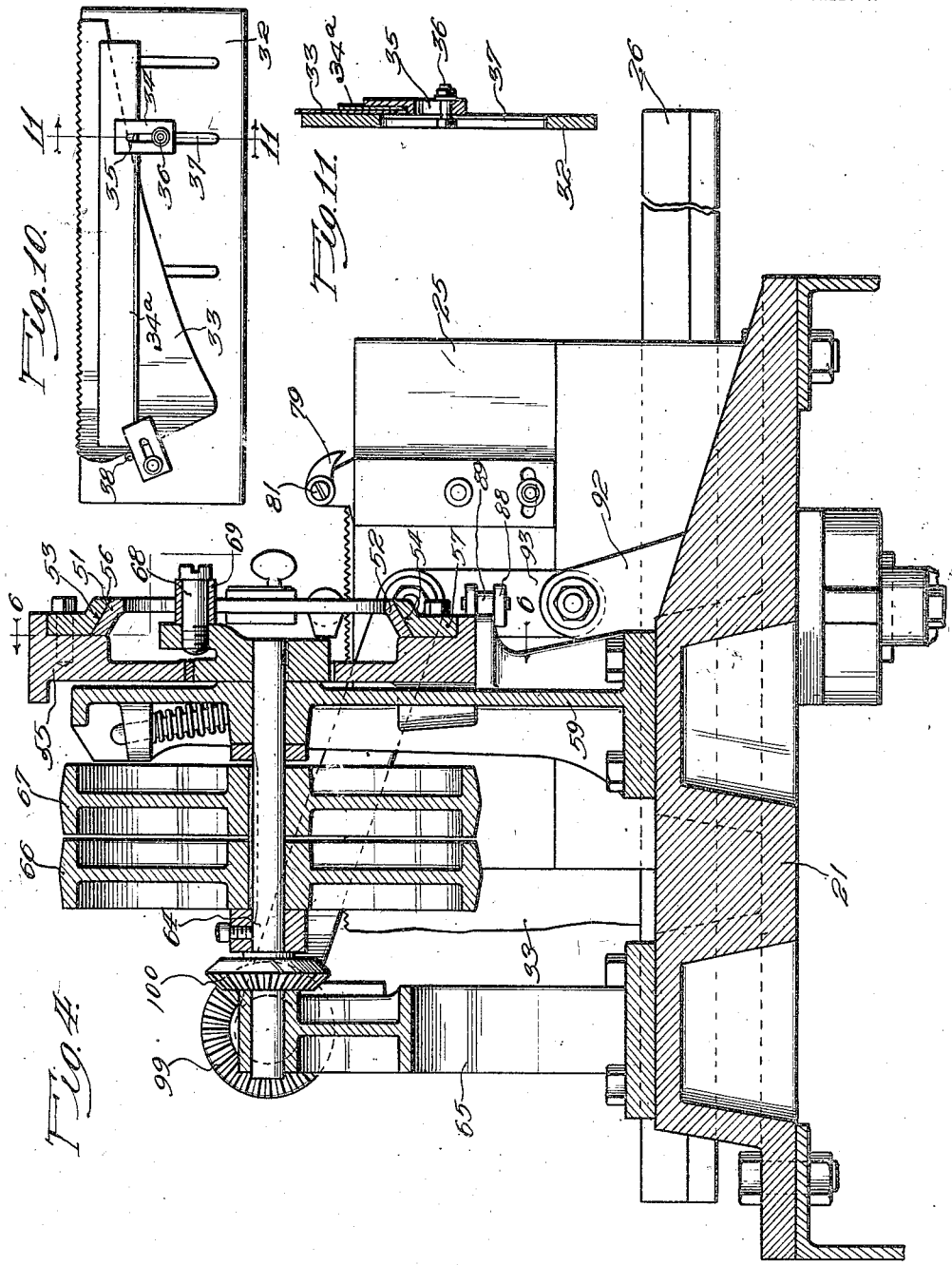
Figure 5:
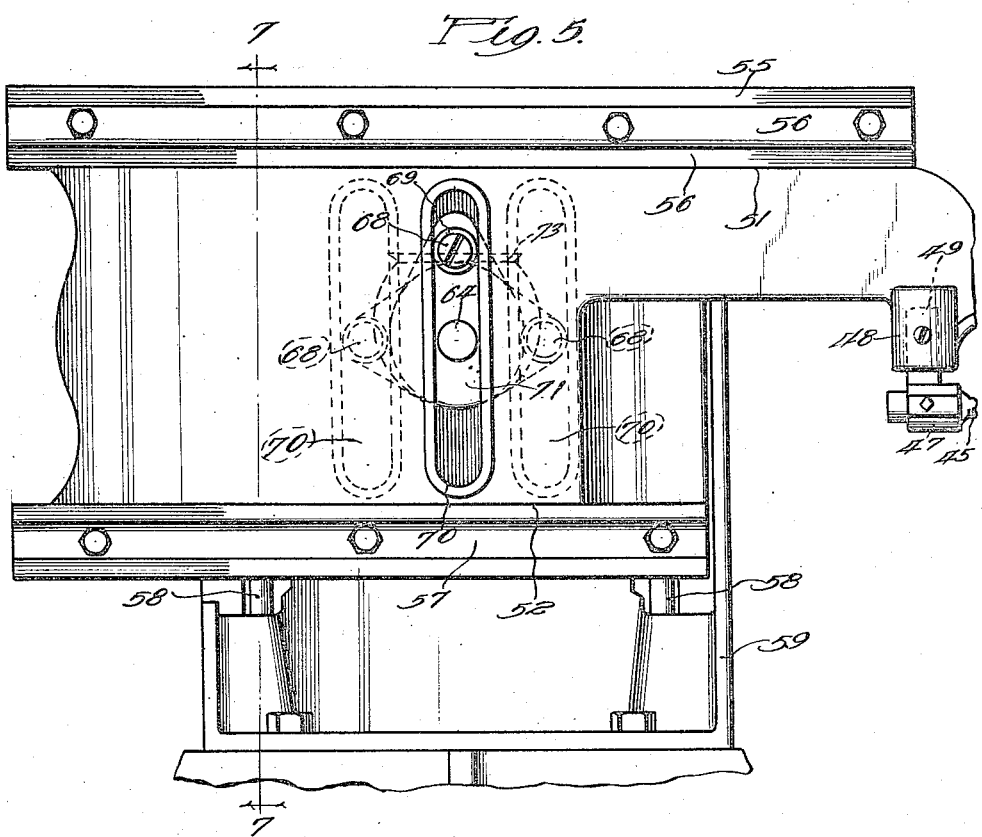
Figure 6:
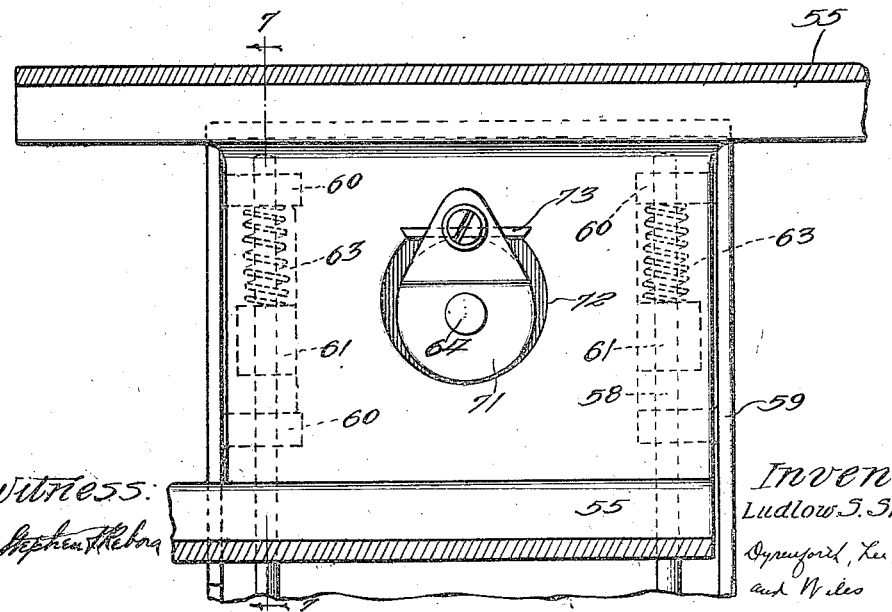
Figure 15:
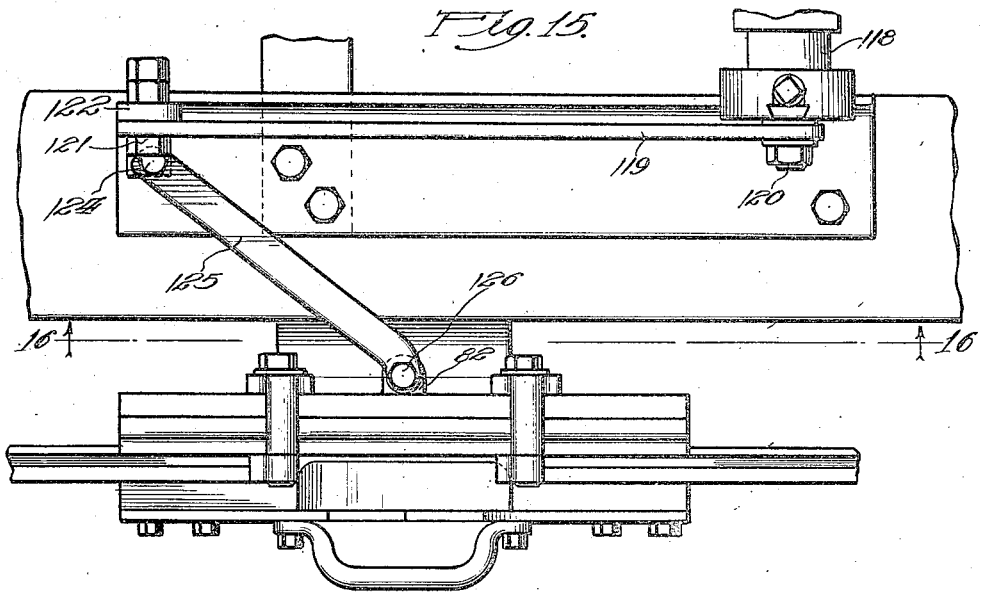

Figure 1 is a plan view of a machine embodying my invention. Figure 2 is a view in side elevation of the machine, the machine being viewed from the left hand side of Fig. 1. Figure 3 is a view in front elevation of the machine, with a portion thereof shown in section as indicated at the line 3—3 on Fig. 1 and viewed in the direction of the arrow. Figure 4 is a section taken at the lines 4 on Figs. 1 and 3 and viewed in the direction of the arrows. Figure 5 is a broken view in rear elevation of a portion of the mechanism for operating the file. Figure 6 is a section taken at the irregular line 6—6 on Fig. 4 and viewed in the direction of the arrows. Figure 7 is a section taken at the lines 7—7 on Figs. 5 and 6 and viewed in the direction of the arrows. Figure 8 is a broken plan view of a portion of the mechanism for producing the automatic intermittent feeding of the saw relative to the file. Figure 9 is a section taken at the line 9—9 on Fig. 8 and viewed in the direction of the arrows. Figure 10 is a view of the holder for the saw to be filed, showing a saw in position therein. Figure 11 is a section taken at the line 11 on Fig. 10 and viewed in the direction of the arrow. Figure 12 is a broken view in elevation, with the main shaft shown in section, of a modification of the mechanism for producing the automatic intermittent feeding of the saw. Figure 13 is a view, partly sectional, with parts broken away, in elevation, of the mechanism of Fig. 12. Figure 14 is a broken plan view of a portion of the mechanism of Figs. 12 and 13. Figure 15 is a plan view of still another modification of mechanism for effecting the automatic intermittent feeding of the saw; and Figure 16 a section taken at the line 16—16 on Fig. 15 and viewed in the direction of the arrows.

Referring more particularly to the construction shown in Figs. 1 to 11 inclusive, the upper portion of the frame of the machine at which it is supported, as for example on a floor, is represented at 20, this frame being of any suitable form and shown as provided with a bed-plate 21. The upper portion of the frame of the machine, at one side thereof contains an upwardly-opening socket 22 into which a stud 23 extends and is adapted to be rotatably adjustable, a set screw 24 screwing in the wall of the socket 22 and adapted to bear against the stud 23 serving to hold the latter in adjusted position. The stud 23 is carried by, and depends from, a saw-guiding member shown as formed of plates 25, 26 and 27, these plates extending parallel to each other and being firmly secured together. The plate 26 lies within the recessed portion 28 in a face of the plate 25 and is overlappingly engaged therewith as shown, plate 27 overlapping the outer face of the plate 26 and these three plates being held together by the screws 29. The plates 25 and 26 are of such form, as shown, as to provide a channel 30 which extends lengthwise of the saw-guiding device, and is of such width as to permit both the holder hereinafter referred to, and a saw thereon, to freely move in this channel, the bottom portion of this channel being of reduced width as represented at 31 and forming a groove into which the lower edge of the holder hereinafter referred to extends and in which it is guidingly movable lengthwise thereof. It will be understood from the foregoing that the saw-guiding member referred to, through the medium of which the saw, with the holder on which it is mounted, is supported and along which the saw with the holder is adapted to be fed for a purpose hereinafter stated is in effect swiveled, at the stud 23 on the frame adapting it to be adjusted to different positions in a horizontal plane for a purpose hereinafter stated.

It may be here stated that inasmuch as the machine is adapted for the filing of saws of different kinds as hereinbefore referred to the holder referred to and represented at 32 is provided. This holder, generally stated, consists of a plate of general rectangular form with its upper and lower edges preferably substantially parallel, and equipped with means for securing to a face thereof, the outer face in the construction shown, a saw-blade, such as that represented at 33, it being desirable that the toothed edge of the saw, when the latter is secured in the holder, extends parallel with the lower edge of the holder 32, and slightly above the upper edge thereof as shown. Any suitable form of means for clamping the saw to the holder 32 may be provided, the means shown comprising blocks 34 containing slots 35 therein through which clamping bolts 36 extend, these bolts extending through vertically disposed slots 37 in the holder plate 32. The plate 32 preferably contains at intervals the slots 37 of such number that saws of different lengths may be clamped to the holder with the desired degree of firmness, the elongation of the slots permitting of the clamping to the holder of saws of different widths. The holder 32 is also provided with a stop-pin 38 for engagement with one end of the saw-blade to facilitate the proper positioning of the latter in the holder. It will be understood from the foregoing that the holder, with the saw, is adapted to be readily introduced into, and withdrawn from, the groove 31 to position it therein for the saw-filing operation, and its withdrawal after the operation has been completed. The plate 27 is equipped with means for yieldingly bearing against the outer ends of the saw for firmly pressing the holder 32 against the bearing surface represented at 39, of the plate 25, these means comprising upwardly converging spring members 40 secured to the plate 27 by the screws 41 and carrying at their upper end a presser-plate 42 secured thereto by the screws 43 and bearing, under the tension of the spring members 42, yieldingly against the saw, the members 40 being connected with a handle 44, by which this presser device may be moved into and out of saw-engaging position, as for example in the case of introducing the holder and saw thereon into the machine and its withdrawal therefrom.

In the particular illustrated embodiment of my invention, the file represented at 45, and which may be the usual three-corner file, is supported in a manner to permit it to be reciprocated across the teeth of the saw as the latter successively move into registration with the file, for sharpening the edges thereof, the file in its outward movement, viz., in its movement to the left in Fig. 2 across the saw, being raised out of engagement with the teeth and in its return movement being lowered to engage the teeth. The file 45 is supported at its ends in heads 46 in accordance with common practice, these heads being mounted, in alined position in housings 47 depending from studs 48 vertically adjustable in socket portions 49 of a plate member 50, the stud members 48 being spaced apart and disposed at opposite sides of the plane in which the saw travels. The plate member 50 is formed with rearwardly-diverging flange portions 51 and 52 at which the plate 50 is guidingly confined in guide grooves 53 and 54, respectively, formed between a plate 55 and bars 56 and 57 rigidly secured to the outer face of the plate 55. The plate 50 which is thus supported on the plate 55 in a manner adapting the former to be reciprocated thereon, and consequently reciprocate the file 45 crosswise of the saw, is operated in a manner hereinafter described. The plate 55 is supported in a manner to permit it to be raised and lowered, for the purpose of lifting the file, through the medium of the connection of the plate 55 with the plate 50, out of engagement with the saw in the outward movement of the file as above stated, the means shown for adapting the plate 55 for such movement, comprising a pair of rods 58 rigidly secured to, and rising from, an upright 59 connected with the bed-plate 21, these rods extending parallel with each other and tightly engaging openings in lugs 60 and extending laterally from the upright 59; and bosses 61 extending laterally from the plate 55 and containing openings 62 therethrough through which the rods 58 extend, the bosses 61 extending through openings 63 in the upright 59 and having sliding fit on the rods 58, the rods 58 being preferably inclined as shown in Figs. 4 and 7 in order that the plate 55 and the parts carried thereby, in the operation of lifting the plate 55, shall move in a path inclined to the vertical and thereby, especially in the case of the filing of saws having undercut teeth, lift the file clear of the undercut sharpened surfaces of the teeth.

The mechanism for reciprocating the plate 50 comprises a drive shaft 64 journaled in bearings in the upright 59 and in an upright 65 rising from the bed-plate 21, this shaft being equipped with tight and loose pulleys 66 and 67 for connection with any suitable source of power through the medium of a belt in accordance with common practice. The shaft 64 at one end, its right hand end in Fig. 4, is provided with a crank pin 68 which extends, preferably at a sleeve 69 thereon, into, and through, a vertically-elongated slot 70 in the plate 50, whereupon upon rotating the shaft 64, the plate 50 is caused to be reciprocated.

The means for effecting the raising and lowering of the plate 55, comprise a cam 71 rigid on the shaft 64 and located within an opening 72 in the plate 55. The plate 55 is supported at a bearing plate 73 thereon, on the cam 71 which latter is preferably of the shape shown (Fig. 6) whereby the plate 55 is in lower position throughout one-half a revolution of the cam 71 (the lowermost portion shown in Fig. 6) and is rising and in raised position throughout the other half of the revolution of the cam, the parts being so constructed and arranged, as shown, that the plate 55, and consequently the file 45, is in lowermost position during the movement of the plate 50 from its extreme left-hand position to its extreme right-hand position.

As a means for insuring the bearing of the file against the saw during the saw filing operations, the coil springs 74 are provided, these springs surrounding the rods 58 and bearing under spring tension at their opposite ends against the lugs 60 and 61.

The mechanism shown for producing the intermittent feeding of the saw to present its teeth in succession to the file, comprises a bar 75 set into a dovetail groove 76 contained in the rear side of the plate 25, and longitudinally slidable in this groove in a direction lengthwise of the said plate, the bar 75 being provided with upwardly-extending members 77 having lateral extensions 77$^a$ which carry pawls 78 and 79 pivotally connected therewith, as indicated at 80 and 81, and arranged to extend above, and engage under the action of gravity with, the teeth of the saw in the movement of the bar 75 to the left in Fig. 2, but ride idly over the teeth in the movement of this plate to the right in this figure. The bar 75 is provided with a laterally-extending lug 82 which extends loosely into the bifurcated portions 83 of a member 84, a pin 85 pivotally coupling this member and lug 82 together. The outer end of the member 84 is in the form of a cylindrical rod 84$^a$ and extends into, and has journal fit in, a socket 86 in a rod member 87 and relative to which it is adapted to slide. The rod member 87 is formed at its opposite end with a bifurcated portion 88 at which it straddles a lug 89 extending from the upright 59 and to which it is pivoted as through the medium of the pivot pin 90. Pivotally connected at its lower end as indicated at 91, on a lug 92 rising from the frame of the machine, is a link 93 containing an elongated slot 94 through which the rod member 87 extends. The upper end of the link 93 is pivotally connected, as indicated at 95, with a bar 96. The bar 96 is eccentrically connected with a shaft 97 journaled in a bearing 98 on the upright 65 and carrying a bevel pinion 99 meshing with a bevel pinion 100 rigidly secured to the shaft 64. The eccentric connection of the bar 96 with the shaft 97 is preferably provided as shown, by providing on the shaft 97 a disk 101 containing a radial slot 102 in which the slide 103 is located, this slide carrying a pin 104 with which the bar 96 has journal connection. The slide 103 is adapted to be adjusted radially of the disk to vary the eccentricity of the pivot connection 104 to vary the length of throw of the bar 96 and the mechanism with which it is connected, as hereinbefore described. Suitable means are employed for holding the slide in adjusted position in accordance with well known practice.

It will be understood from the foregoing that in the rotation of the shaft 97 the bar 75 will be caused to be reciprocated, together with the pawls 78 and 79 thereon, to produce the saw-feeding movement, the adjustment of the eccentric connection of the bar 96 with the shaft 97 permitting of the varying of the length of movement of the pawls to cause them to correspond with the distance between adjacent teeth of the saw to be operated on.

A description of the operation of the machine is as follows:

The operator first clamps in the removable saw-holder formed of the plate 32, the saw to be sharpened, and thereupon introduces the holder into the groove 31, from the right hand side of the machine in Fig. 2 and into a position wherein the pawl device 78, located in the rear of the file 45, will engage the teeth of the saw. Power is then applied to the shaft 64 to rotate it, as by throwing the belt of the drive onto the tight pulley on the shaft 64, whereupon the file is caused to be reciprocated back and forth relative to the saw. The arrangement of the parts is such, as hereinbefore described, that as the file moves to the left, viewing the machine as viewed in Fig. 3, the file will be in raised position and will not contact with the saw, but during its return movement will be in lowered position and sharpen the adjacent tooth-portion of the saw. During the movement of the file for sharpening the saw as stated the feeding-pawl mechanism referred to moves to the right in Fig. 2, thereby moving idly over the saw teeth, but in the opposite movement of the file the feeding pawl mechanism moves to the left in Fig. 2, thereby advancing the saw a distance equal to the length of a tooth, whereby the file in its next movement to the right in Fig. 3 sharpens the portion of the saw newly presented to the file, these alternate operations continuing until all of the teeth have been operated on by the file. In this connection attention may be directed to the fact that by the use of a plurality of pawls at opposite sides of the file all of the teeth of the saw may be caused to be operated on by the file. At the beginning of the sharpening operation pawl 78 performs the feeding function, and toward the end of the operation the pawl 79 alone performs the feeding function, both pawls operating conjointly on the saw to feed it during the sharpening of the intermediate portion of the saw.

The swivel adjustment of the guide means for the holder and saw, particularly in connection with the saw-feed mechanism carried by these guiding means, serves as a means whereby the saw may be caused to be positioned at any desired angle relative to the path of movement of the file in reciprocating. The saw may be caused to be guided in its feed movement at right angles to the line of movement of the file, as illustrated in the drawings, which is desirable for shapening certain kinds of saws which require that the shapened surfaces of the teeth extend at a right angle to the plane of the saw; or by the adjustment of the guide member, at its swivel connection with the machine, the saw may be caused to extend at any desired oblique angle to the line of movement of the file, thereby causing the sharpened surfaces of the teeth to extend at the desired oblique angle relative to the plane of the saw. In this connection the feature of mounting the saw in a holder which may be fed through the machine relative to the file, is an advantage as in the case of some saws it is desirable to sharpen alternate teeth to a different angle than the others, in which case the saw-feeding mechanism would be so adjusted that the saw would be fed a distance equal to twice the distance between adjacent teeth with each feeding operation. After sharpening alternate teeth to the desired angle in one machine the holder with the saw thereon may be readily removed and introduced into another machine of the same construction as that shown but with the guide for the saw so adjusted that the saw would extend at the desired oblique angle relative to the file but in the opposite direction as compared with the machine in which the saw was first operated on.

As regards the feature of so associating the feed mechanism with that part of the machine which affords the guide for the saw, as to cause the feed mechanism to move with the guide member in the adjustments of the latter for varying the angle at which the saw moves relative to the file, separate adjustment of the feed mechanism to compensate for such angular adjustment of the guide member, is avoided.

In Figs. 12, 13 and 14 I have illustrated a modification of the mechanism for reciprocating the pawl-carrying plate 75. In this arrangement the main shaft 64 carries a helical gear 105 which meshes with a similar gear 106 secured to a shaft 107 and to the outer end of which latter a bar 108 is pivotally connected eccentrically of the shaft 107 as indicated at 109, and in the manner as explained of the connection of the bar 96 with the shaft 97. The bar 108 extends into the bifurcated end portion 110 of a member 111 which has swivel connection at its lower end portion 112 in a vertical socket 113 in the stationary upper frame portion of the machine. The outer end of the member 111 contains a socket 114 in which a bar 115 is adapted to longitudinally move, the outer end of this bar being bifurcated, as indicated at 116, and into which portion a lug 82 extends and is pivotally connected, as through the medium of a pivot pin 117. It will be understood from the foregoing that in the rotation of the shaft 64 the member 104 will be rocked in a horizontal plane through the medium of the reciprocating bar 108 and will operate to reciprocate the slide bar 75 for actuating the pawl mechanism to perform the feeding operation.

Figure 16:
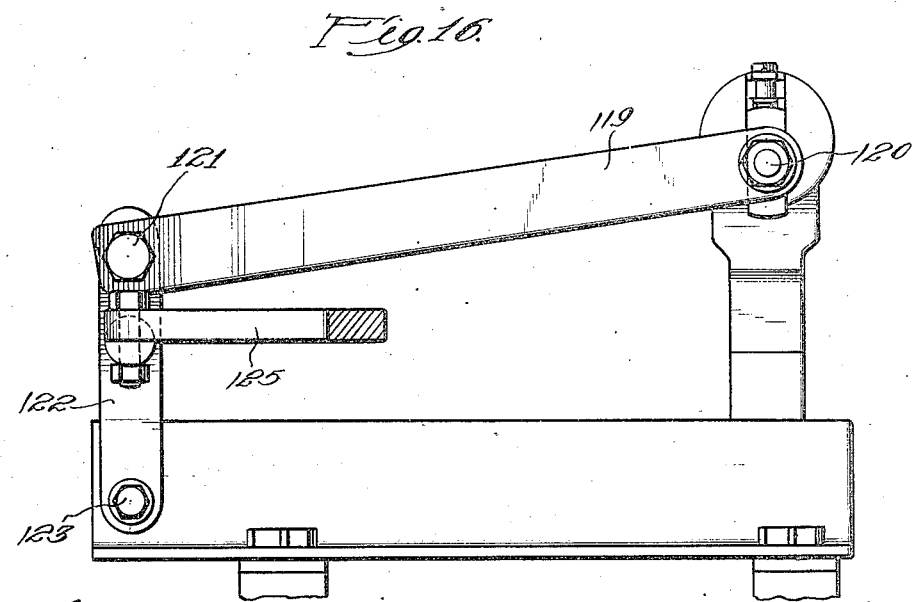

Figures 15 and 16 show still another arrangement for effecting the intermittent feeding of the saw by reciprocating the slide bar 75. In this arrangement the shaft 118, corresponding with the shaft 97 of Figs. 1 to 11 inclusive, has pivotally connected therewith, a bar 119 as indicated at 120, as explained of the construction in the figures just referred to. The opposite end of the bar 119 is pivotally connected at 121 with the upper end of a rock-member 122 pivotally connected at 123 to a stationary part of the frame of the machine. The member 122 intermediate the pivots 121 and 123 has connection, preferably by means of a universal joint represented at 124, with one end of a link 125 which pivotally connects at its outer end, as indicated at 126, preferably by a universal joint, with the lug 82 on the bar 75. It will thus be understood that rotation of the shaft 118 operates to rock the member 122 which latter causes the slide bar 75 to be reciprocated.

It will be noted from the foregoing that, as stated, in the particular construction illustrated the file moves in engagement with the teeth of the saw to produce the sharpening, in the movement of the file to the left in Fig. 3, but, if desired, the machine may be altered, within my invention, to reverse this operation and thereby cause the file to sharpen the saw in its movement to the right in Fig. 3.

It will also be understood that where the teeth of a saw are to be cut at different angles, as for example each alternate tooth at a different angle than the teeth with which they alternate, instead of employing two machines as suggested in the foregoing, one machine only may be used, in view of the adjustments provided therein, the operator resetting the machine each time the teeth are to be sharpened to a different angle.

While I have illustrated certain particular constructions of machines in which my invention is embodied, I do not wish to be understood as intending to limit my invention thereto, as the same may be variously further modified and altered as to that portion of the mechanism as to which certain modifications are shown, and variously modified and altered as to the other features of the machine, without departing from the spirit of my invention.

What I claim as new and desire to secure by Letters Patent, is:

1. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operating, when actuated, to feed the saw along said first-named device, said last-named means being operatively connected with said first-named device and movable therewith in the adjustment of the latter.

2. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operatively connected with said first-named device and movable therewith to engage the teeth of the saw and feed the latter along said first-named device.

3. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operating, when actuated, to feed the saw along said first-named device, said last-named means being operatively connected with said first-named device and movable therewith in the adjustment of the latter and comprising a pawl through the medium of which the saw is fed.

4. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operating, when actuated, to feed the saw along said first named device, said last-named means being operatively connected with said first-named device and movable therewith in the adjustment of the latter and comprising a pawl engaging the teeth of the saw.

5. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means engaging the teeth of the saw for intermittently feeding the saw along said first-named device constructed and arranged to maintain the proper positioning of said last-named means for producing accurate feeding in the relative positioning, under adjustment, of said first-named device relative to said other device.

6. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means for intermittently moving the saw to feed it comprising a reciprocal slide on said first-named device, means for operating said slide, and pawl mechanism on said slide.

7. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operating, when actuated, to feed the saw along said first-named device, said last-named means being operatively connected with said first-named device and movable therewith in the adjustment of the latter and comprising a reciprocal slide on said first-named device, means for operating said slide, and pawl mechanism on said slide.

8. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means for intermittently moving the saw to feed it comprising a plurality of pawls arranged at opposite sides of said sharpening device and adapted to engage the teeth of the saw for feeding the latter, and means for actuating said pawls.

9. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means operating, when actuated, to feed the saw along said first-named device, said second-named means being operatively connected with said first-named device and movable therewith in the adjustment of the latter and comprising a plurality of pawls arranged at opposite sides of said sharpening device and adapted to engage the teeth of the saw for feeding the latter, and means for actuating said pawls.

10. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means for intermittently moving the saw to feed it comprising a reciprocal member, pawls on said member and extending at opposite sides of said sharpening device and adapted to engage the teeth of the saw for feeding the latter, and means for reciprocating said member.

11. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, means operating, when actuated, to feed the saw along said first-named device, said second-named means being operatively connected with said first-named device and movable therewith in the adjustment of the latter and comprising a reciprocal member, pawls on said member and extending at opposite sides of said sharpening device and adapted to engage the teeth of the saw for feeding the latter, and means for reciprocating said member.

12. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, and means for intermittently moving the saw to feed it comprising a plurality of pawls on said first-named device and arranged at opposite sides of said sharpening device and adapted to engage the teeth of the saw for feeding the latter, and means for actuating said pawls.

13. In a saw-sharpening machine, the combination of a device for supporting a saw to be sharpened, a member presenting inclined guiding means, a sharpening device engaging said guiding means, means for raising and lowering said sharpening device on said guiding means, and means for producing relative movement between said devices in a path crosswise of the plane in which the saw extends, the inclination of said guiding means being such as to permit said sharpening device to clear the sharpened surface in its rising movement.

14. In a saw-sharpening machine, the combination of a device for supporting a saw to be sharpened, a sharpening device extending at an angle to the saw, means for producing relative movement between said devices in a path crosswise of the plane in which the saw extends to perform the sharpening operation, said first-named device being adjustable to vary the angle at which the saw extends relative to said sharpening device, means engaging the teeth of the saw for intermittently feeding the saw along said first-named device constructed and arranged to maintain the proper positioning of said last-named means for producing accurate feeding in the relative positioning, under adjustment, of said first-named device relative to said other device, comprising a reciprocable slide carried by said first-named device, a pawl thereon, and mechanism for operating said slide, said last-named mechanism comprising a lug extending laterally from the reciprocable slide, a telescopic bar with both ends bifurcated connected to said lug at one end and at the other end to a fixed part of the machine, a slotted link surrounding said bar, and a driven eccentric operatively connected with said link to reciprocate the latter.

15. A saw-holder comprising a saw-supporting member, means whereby a saw may be connected with said member, and a spring member yieldingly bearing against a face of the saw adjacent the teeth thereof.

16. Saw-holding means comprising a supporting member, a second member on which the saw is supported, said second member being supported on said first-named member to be movable along the same in a direction lengthwise of the saw, and a spring member carried by said first-named member and engaging a face of the saw.

17. Saw-holding means comprising a supporting member presenting a surface for opposing a side of the saw adjacent its teeth, a second member on which the saw is supported, said second member being supported on said first-named member to be movable along the latter lengthwise of the saw, and a spring member operating to yieldingly force the saw against said surface.

18. Saw-holding means comprising a supporting member presenting a surface for opposing a side of the saw adjacent its teeth, a second member on which the saw is supported, said second member being supported on said first-named member to be movable along the latter lengthwise of the saw, and a spring member on said first-named member and operating to yieldingly force said saw against said surface.

19. A saw-holder comprising a saw-supporting member having a portion which extends closely adjacent to the teeth of the saw at one face of the saw, means whereby a saw may be connected with said member, and a spring member yieldingly bearing against the other face of the saw adjacent the teeth thereof.

20. Saw-holding means comprising a supporting member, a second member on which the saw is supported having a portion which extends closely adjacent to the teeth of the saw at one face of the saw, said second member being supported on said first-named member to be movable along the latter in a direction lengthwise of the saw, and a spring member connected with said first-named member and engaging the other face of the saw.

LUDLOW S. SHERWOOD.